April 17, 1928.
B. L. MALLORY
1,666,261
SHOCK ABSORBER
Filed Jan. 11, 1926
2 Sheets-Sheet 2
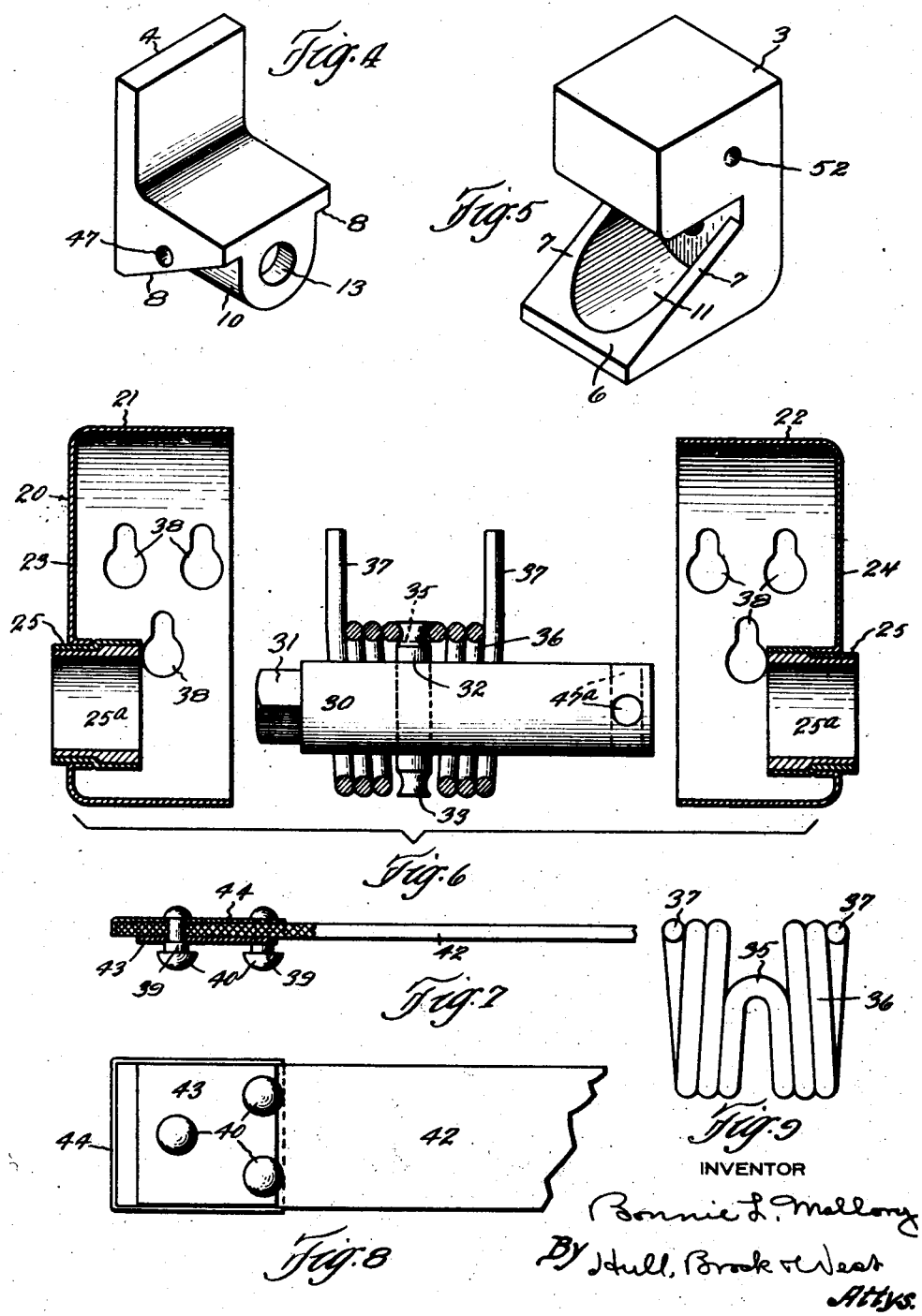

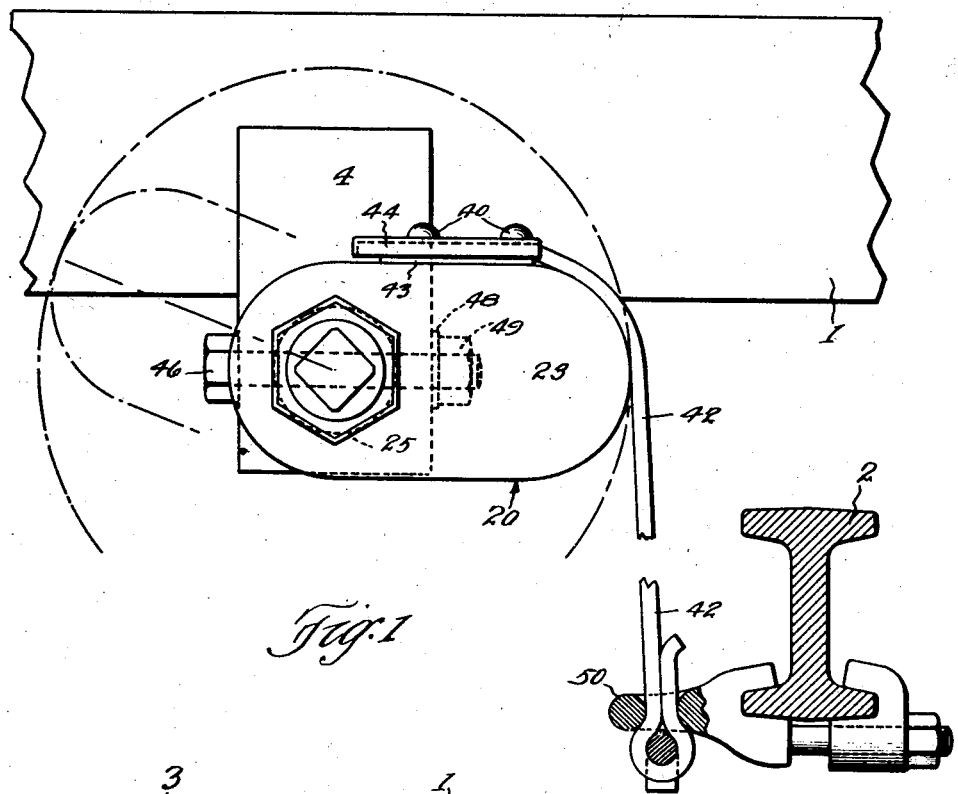
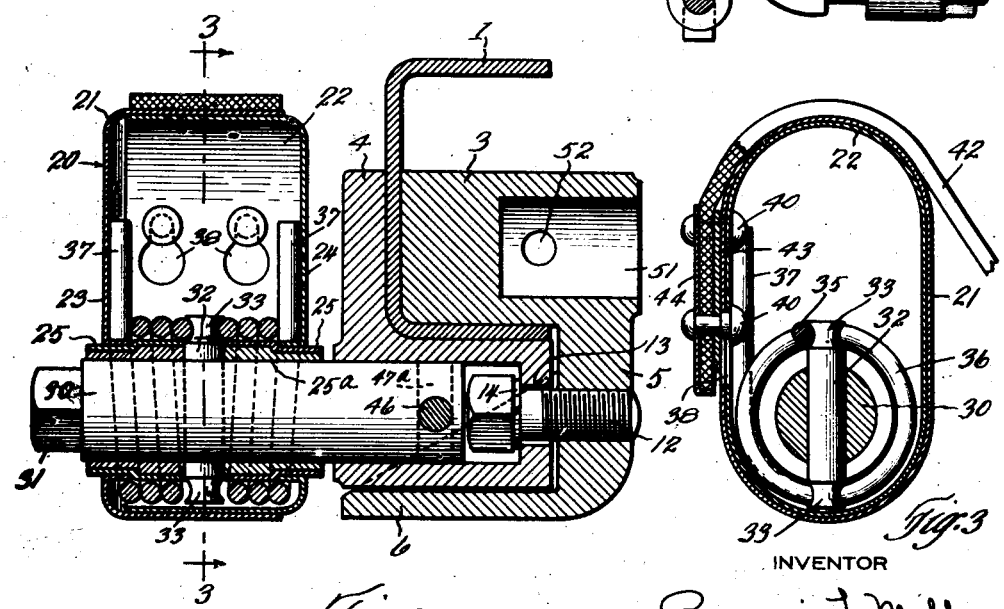

Patented Apr. 17, 1928.

1,666,261

UNITED STATES PATENT OFFICE.

BONNIE L. MALLORY, OF CLEVELAND HEIGHTS, OHIO.

SHOCK ABSORBER.

Application filed January 11, 1926. Serial No. 80,495.

This invention relates to the class of devices known as shock absorbers that are used on vehicles for retarding the recoil action of the body suspension springs thereby to improve the riding qualities of the vehicle and prevent breakage of the springs.

Among the objects of the invention are to provide a shock absorber that is very effective; that is simple of construction; that is cheap; that is strong and durable and that is practically immune from disorder; that is designed to facilitate and expedite manufacture, assembly and installation, no loose or detached fastening means being required to hold the parts of the device together, and it being unnecessay, furthermore, to drill holes in the frame of the vehicle for attaching purposes; to provide convenient means for adjusting the tension of the actuating spring; and to provide a device of the character set forth which requires little or no attention after it is once installed and adjusted, this being accounted for largely by the use of oilless bearings for the oscillating body.

A further and more specific object of the invention is to provide a unique clamp for securing the device to the frame of the vehicle and which requires the use of only one screw, or its equivalent, for securing the parts in place.

The foregoing objects, with others hereinafter appearing, are obtained in the embodiment of the invention illustrated in the accompanying drawings wherein Fig. 1 shows my improved shock absorber in side elevation and as applied to a vehicle, fragments of the vehicle being shown associated with the device; Fig. 2 is a central vertical section through the device, showing it secured to the frame of a vehicle and with the oscillating body in vertical position; Fig. 3 is a section through the oscillating body on the line 3—3 of Fig. 2; Figs. 4 and 5 are perspective views of the outer and inner clamping members, respectively; Fig. 6 shows the parts of the oscillating body, its sustaining stud and actuating spring in dismantled condition and, in most part, in section; Figs. 7 and 8 are fragmentary details of the flexible element or strap, through which the oscillating body is swung in opposition to the actuating spring; and Fig. 9 is an elevational view of the actuating spring.

One of the frame members of a vehicle chassis is designated 1 in Figs. 1 and 2, and in the former view the axle of the vehicle is shown at 2. The frame member 1 is of the usual channel construction and adapted to be secured thereto are the respective inner and outer clamping members 3 and 4. The latter member is designed to fit the lower portion of the outer and the underneath sides of the frame member. The inner member 3 has a part fitting within the lower angle of the frame member, and depending from the inner end of such part is a leg 5 which is extended outwardly at its lower end, as shown at 6. The lateral edges of the part 6 are inclined upwardly and inwardly, as at 7, for cooperation with the correspondingly inclined portions 8 of the outer clamping member 4. Between such inclined parts 8, the member 4 is provided with a hollow boss 10 which fits within a recess 11 of the part 6 of member 3 between the inclined edges 7 thereof. A screw 12 is adapted to be inserted through the bore of the hollow boss 10 and projected through a relatively large hole 13 in the end wall of said bore and screwed into a tapped hole in the leg 5 of the member 3.

In applying the clamp to a vehicle frame, the members 3 and 4 are engaged with the inner and outer sides of the frame member, with the boss 10 of the outer member occupying the recess 11 of the inner member. The screw 12 is then inserted through the bore of the boss 10 and engaging with the threaded aperture of the leg 5, and by the use of a suitable socket wrench the screw may be operated to firmly draw the clamping members together against the opposed sides of the web of the channel frame member 1, the inclined parts 7 and 8 of the respective clamping members co-acting to draw the members together in a vertical direction thereby to securely clamp them to the bottom flange of the frame member. It will be observed that a split locking washer 14 is employed to hold the screw 12 from turning.

What has heretofore been referred to as the oscillating body is designated generally by the reference numeral 20 and, according to the present embodiment, the same is composed of two sections 21 and 22 in the form of sheet metal stampings, the latter section telescoping within the former The opposed walls 23 and 24 of the respective sections 21 and 22 are provided with hexagonal, flanged openings which receive the correspondingly shaped outer ends of bushing 25. The inner ends of these bushings are cylindrical, as indicated in dotted lines in Fig. 1, and are of a diameter between the minimum and maximum diameters of the hexagonal portions of the bushings thereby to provide shoulders which engage the inner edges of the flanges which surround the openings in the opposed walls of the body. These bushings are preferably formed of linings 25ª of a suitable, permanent lubricant-containing compound that are enveloped by die-formed sheet metal jackets having the shape above described.

The oscillating body is mounted upon a stud 30 which is formed, at its outer end, for the application of a wrench, as indicated at 31. A suitable distance inwardly from its outer end the stud has a transverse bore through which a pin 32 is driven, the ends of the pin being circumferentially grooved, as indicated at 33.

The opposed parts 21 and 22 of the body or casing 20 are applied to the opposite ends of the stud 30 and brought together with the bushings 25 on opposite sides of the pin 32, the pin serving to maintain the body against longitudinal displacement on the stud. The central portion 35 of what has been referred to as the actuating spring, and which is designated generally by the reference numeral 36, is engaged about one of the grooved ends of the pin 32 and is coiled about the bushings 25 and has its ends 37 engaging the interior of one of the sides of the body or casing 20. The overlying peripheral walls of the sections 21 and 22 which constitute the side of the body that is engaged by the spring have registering keyhole slots 38 which are adapted to receive the necks 39 of rivets 40 that are carried by the end of a flexible element or strap 42 by means of which the body is oscillated in opposition to the action of the spring 36, as will presently appear. The shanks of the rivets 40 pass through plates 43 and 44 that are applied to the opposite sides of the element or strap 42, the plates serving to clamp the material of the strap between them and thus relieve it of strains which would otherwise be restricted to its points of engagement with the rivets.

The stud 30 is designed to fit within the bore of the boss 10 of the clamping member 4, and it is held therein against turning with respect to said clamping member by a bolt 46 that is passed through apertures 47 in the sides of the clamping member 4 and through one or the other of right angle holes 47ª in the inner end of the stud 30. A split locking washer 48 and a nut 49 are shown applied to the bolt 46.

In installing the device, after the clamping members have been applied to the vehicle frame and the stud 30 has been secured within the bore of the outer clamping member by means of the bolt 46, the end of the flexible element or strap 42, opposite the one attached to the body 20, is secured, by suitable means designated 50, to the axle 2 of the vehicle; and it may be explained that when the frame and axle are in normal relation, the oscillated body should occupy a substantially horizontal position, as indicated in full lines in Fig. 1. A wrench is now applied to the portion 31 of the stud 30 and the bolt 46 is removed and the stud is rotated in a direction to wind up the spring 36 to the required tension to properly retard the recoil action of the vehicle springs, the tension of the actuating spring 36 being determined by the weight of the vehicle and the stiffness of the body suspension springs. When the proper tension has been attained, the bolt 46 is replaced and the split washer and nut 48 and 49 are applied thereto and the device is thus placed in condition for use.

When the device is used on some makes of vehicles, it is necessary to locate it inside the frame, and provision is made for doing this by including a recess 51 in the inner clamping member 3 to which the stud 30 may be transferred. The bolt 46 is then accommodated by the holes 52.

The operation of the device is obvious from the foregoing description, although it may be mentioned that when the body 20 swings toward or beyond vertical position the leverage against which the flexible element 42 acts is materially shortened thereby to increase the effective resistance offered by the device to the recoil action of the vehicle springs just at the time it is most needed.

Having thus described my invention, what I claim is:—

1. A shock absorbing device for use with two relatively movable members comprising a stud supported for rotary adjustment by one of said members, an elongated body journaled on the stud, a spring having a part anchored to the stud and a part co-acting with the body whereby the spring tends to rotate the body in one direction, a flexible element having one of its ends attached to the body and its opposite end fastened to the other of said members, said element exerting a pull upon the body in opposition to the spring, means for angularly adjusting the stud with respect to the member whereby it is carried, and means for locking the stud in any of a plurality of adjusted positions.

2. A shock absorbing device for use with two relatively movable members comprising a stud adapted to be secured to one of the members, an elongated hollow body journaled adjacent one of its ends upon the stud, a spring surrounding the stud and anchored thereto, the spring being enclosed by and co-acting with the body and tending to rotate it on the stud, and a flexible element engaged about and bearing upon the peripheral portion of the free end of the body and having its adjacent end secured thereto while its opposite end is adapted to be secured to the other of the aforesaid members, said element exerting a pull upon the body in opposition to the spring.

3. A shock absorbing device for use with two relatively movable members comprising a stud carried by one of said members, a pin extending laterally from the stud, a hollow elongated body journaled upon the stud and enclosing the pin, a spring coiled about the stud and having its central portion engaged about the pin and its ends bearing against one of the sides of the hollow body, and a flexible element having one of its ends attached to said body while its opposite end is adapted to be fastened to the other of the aforesaid members, said element being arranged to exert a pull upon the body in opposition to the spring.

4. A shock absorbing device for use with two relatively movable members comprising a stud that is adapted to be carried by one of said members, a pin extending transversely through the stud, an elongated hollow body journaled upon said stud and comprised of opposed parts that are located on the opposite sides of said pin, a spring coiled about the stud and having its central portion engaged about one end of said pin and its ends bearing on one of the sides of the body, and a flexible element having one of its ends attached to the body while its opposite end is adapted to be fastened to the other of the aforesaid members, the element being arranged to exert a pull upon the body in opposition to the action of the aforesaid spring.

5. A shock absorbing device for use with two relatively movable members comprising a stud that is adapted to be carried by one of said members, a pin extending transversely through the stud, an elongated hollow body journaled upon said stud and comprised of opposed parts that are telescoped one within the other on the opposite sides of said pin, a spring coiled about the stud and having its central portion engaged about one end of said pin and its ends bearing on one of the sides of the body, the telescoping portions of the body having registering openings, and a flexible element having parts carried by one of its ends that are adapted to be engaged through said openings for attaching said element to the body and for holding the telescoping parts of the body together, the opposite end of said element being adapted to be fastened to the other of the aforesaid members, the element being arranged to exert a pull upon the body in opposition to the action of the aforesaid spring.

6. A shock absorbing device for use with two relatively movable members comprising a stud that is adapted to be carried by one of said members, a pin extending transversely through the stud, opposed elongated casing sections incorporating bushings that are journaled on the stud on opposite sides of the aforesaid pin, the opposed casing sections having peripheral walls that telescope one within the other, a spring having its middle portion looped about one end of the aforesaid pin, the spring being coiled about the bushings on opposite sides of said pin and having its ends engaged with one of the peripheral walls of the casing, overlying parts of the peripheral walls of the two casing sections having registering key-hole slots, and a flexible element provided at one end with buttons that are adapted to be engaged through said slots thereby to secure said element to the casing and the sections of the casing together.

7. A shock absorbing device comprising a stud, a pin extending laterally from said stud, a casing consisting of opposed telescoping sections that are adpated to be brought together upon the stud on opposite sides of the aforesaid pin, the sections having flanged apertures in their opposed walls which are other than circular in cross section, bushings fitted within said apertures and bearing upon the stud, a spring coiled about the bushings and having its middle portion engaged over the aforesaid pin and its ends bearing upon the peripheral wall of the casing, a flexible element having one of its ends engaged about a part of the casing, and means for securing said element to the casing and the sections of the casing together.

8. A shock absorbing device comprising a stud, a pin extending laterally from the stud, an elongated casing consisting of opposed telescoping sheet metal shells, said shells having apertures in their opposed walls adjacent one end of the casing, said apertures being other than circular, sheet metal jacketed oilless bushings having parts fitted within the apertures of the casing sections and journaled upon the stud on opposite sides of the aforesaid pin, a spring coiled about the bushings and having its middle portion looped about said pin and its ends engaging one of the sides of the casing, a flexible element engaged about the end of the casing remote from the stud, and means for fastening the element to the casing and for securing the sections of the casing together.

9. A shock absorbing device for use with two relatively movable members comprising a support that is adapted to be secured to one of said members, said support having a bore, a stud having a part fitting within said bore, said part having a series of holes in the same transverse plane, the support having a hole in register wherewith any one of the former holes are adapted to be placed, means adapted to be projected through the hole in the support and engaged with the holes of the stud for locking the stud to the support in various angular positions with respect thereto, an elongated body journaled upon the stud, a spring having a part anchored to the stud and another part cooperating with the body, the spring tending to rotate the body with respect to the stud, and a flexible element having one of its ends secured to the body while its other end is adapted to be fastened to the other of the aforesaid members, the flexible element being arranged to exert a pull upon the body in opposition to the spring, the stud having facilities for turning it with respect to the support thereby to adjust the tension of the spring.

10. In combination with a vehicle frame having a part that is angular in cross section, opposed clamping members for engagement with the inner and outer sides of the angular part of the frame, means for drawing said members together, the members having cooperating cam portions which serve to impart oblique relative movement between the members as they are drawn together whereby the angularly related parts of the frame will be clamped between said members, one of said members having a bore that is reduced at its inner end and is adapted to register with an opening in the other member, fastening means adapted to be inserted within the bore and projected through the opening in said other member for drawing the members together, a stud having a part adapted to be secured within the outer end of the bore, and a shock absorbing device carried by the stud.

11. In combination with a vehicle frame, opposed clamping members for engagement with the inner and outer sides of the frame, means for drawing said members together thereby to clamp them to the frame, and a shock absorbing device, each of the clamping members having facilities for supporting the shock absorbing device.

In testimony whereof, I hereunto affix my signature.

BONNIE L. MALLORY.